United States Patent
Zhu et al.

(10) Patent No.: US 12,387,414 B2
(45) Date of Patent: Aug. 12, 2025

(54) AVATAR LIVESTREAMING METHOD AND APPARATUS

(71) Applicant: SHANGHAI BILIBILI TECHNOLOGY CO., LTD., Shanghai (CN)

(72) Inventors: Jialing Zhu, Shanghai (CN); Jiangtao Hu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 240 days.

(21) Appl. No.: 18/198,209

(22) Filed: May 16, 2023

(65) Prior Publication Data

US 2023/0377244 A1   Nov. 23, 2023

(30) Foreign Application Priority Data

May 18, 2022 (CN) .......................... 202210548103.6

(51) Int. Cl.
   *G06T 15/00* (2011.01)
   *G06T 13/40* (2011.01)
   *G06V 40/16* (2022.01)

(52) U.S. Cl.
   CPC ............ *G06T 15/005* (2013.01); *G06T 13/40* (2013.01); *G06V 40/176* (2022.01)

(58) Field of Classification Search
   CPC ...... G06T 15/005; G06T 13/40; G06V 40/176
   See application file for complete search history.

(56) References Cited

U.S. PATENT DOCUMENTS

| | | | |
|---|---|---|---|
| 2016/0133230 A1* | 5/2016 | Daniels | G06F 3/147 345/633 |
| 2019/0261062 A1 | 8/2019 | Su et al. | |
| 2022/0070236 A1* | 3/2022 | Yerli | H04L 63/0861 |
| 2022/0345665 A1* | 10/2022 | Gronau | H04N 7/144 |
| 2023/0182028 A1* | 6/2023 | Shen | A63F 13/355 463/42 |

FOREIGN PATENT DOCUMENTS

| | | |
|---|---|---|
| CN | 105302580 A | 2/2016 |
| CN | 106528303 A | 3/2017 |
| CN | 106598739 A | 4/2017 |
| CN | 110557625 A | 12/2019 |

(Continued)

*Primary Examiner* — Michelle Chin
(74) *Attorney, Agent, or Firm* — BakerHostetler

(57) ABSTRACT

This application discloses an avatar livestreaming method. The method includes monitoring a selection of an avatar as an online streamer by a user; starting, by a live process, a rendering process in response to detecting the selection; creating, by the rendering process, a shared texture configured to enable the live process to obtain a rendering result; creating, by the live process, a shared memory through which the live process and the rendering process exchange data except the rendering result; collecting in real time, by the live process, facial data indicating movements or expressions associated with a face or a head of the user and synchronizing the facial data to the rendering process; rendering, by the rendering process, the avatar in the shared texture based on the facial data; and obtaining, by the live process, the rendering result in the shared texture.

16 Claims, 3 Drawing Sheets

(56) References Cited

FOREIGN PATENT DOCUMENTS

| | | |
|---|---|---|
| CN | 110971930 A | 4/2020 |
| CN | 112631635 A | 4/2021 |
| CN | 112929740 A | 6/2021 |
| CN | 113242440 A | 8/2021 |
| CN | 113824982 A | 12/2021 |
| JP | 2020-071851 A | 5/2020 |
| WO | WO 2022/062678 A1 | 3/2022 |

* cited by examiner

AVATAR LIVESTREAMING METHOD AND APPARATUS

CROSS-REFERENCE TO RELATED APPLICATION

The present application claims priority to Chinese Patent Application No. 202210548103.6, filed on May 18, 2022, which is incorporated herein by reference in its entirety.

BACKGROUND

With development of Internet technologies, live streaming has also been greatly developed. Live streaming is when the streamed video is sent over the Internet in real time, without first being recorded and stored. TV broadcasts, video game streams, and social media video can all be live-streamed. Improved techniques for living streaming are desired.

SUMMARY

An objective of embodiments of this application is to provide an avatar livestreaming method and system, to resolve a problem in a conventional technology that system overheads are large and page stalling occurs because Unity copies a rendering result from a video memory to a memory after completing rendering of an avatar in the video memory.

An aspect of the embodiments of this application provides an avatar livestreaming method, applied to a live application that includes a live process and a rendering process, and including:
  sending, by the live process, a loading instruction of an avatar to the rendering process, so that the rendering process loads the avatar based on the loading instruction;
  obtaining, by the live process, face data of a user, and synchronizing the face data to the rendering process, so that the rendering process renders the loaded avatar based on the face data; and
  obtaining, by the live process, a rendering result by using a shared texture created by the rendering process, and pushing the rendering result as a video stream to a live server, where the rendering result is obtained after the rendering process renders the loaded avatar based on the face data.

Optionally, the live process and the rendering process implement inter-process data exchange by using a shared memory.

Optionally, data exchanged when the live process and the rendering process implement inter-process data exchange by using the shared memory is all data except data of the rendering result in avatar livestreaming.

Optionally, the method further includes:
  after receiving an avatar adding instruction triggered by the user, starting, by the live process, the rendering process, where the rendering process creates the shared texture after being started; and
  receiving, by the live process, a ready message sent by the rendering process, and when receiving the ready message sent by the rendering process, sending, by the live process, the loading instruction of the avatar to the rendering process.

Optionally, the method further includes:
  after being started, writing, by the rendering process, a handle of the shared texture and a ready message into the shared memory.

Optionally, loading, by the rendering process, the avatar based on the loading instruction includes:
  obtaining, by the rendering process, the avatar based on storage path information that is of the avatar and that is carried in the loading instruction; and
  performing, by the rendering process, a loading operation on the obtained avatar.

Optionally, after the performing, by the rendering process, a loading operation on the obtained avatar, the method further includes:
  writing, by the rendering process, a loading result into the shared memory, so that the live process displays the loading result in a live interface.

Optionally, the obtaining, by the live process, a rendering result by using a shared texture created by the rendering process includes:
  opening, by the live process, the shared texture by using a handle of the shared texture; and
  copying, by the live process to a texture block created in advance by the live process in a video memory, the rendering result stored in the shared texture.

Optionally, rendering, by the rendering process, the loaded avatar based on the face data includes:
  driving, by the rendering process, the loaded avatar based on the face data, to obtain a driven avatar; and
  rendering, by the rendering process, the driven avatar by using a render-to-texture technology.

Optionally, the method further includes:
  when receiving an avatar delete instruction triggered by the user, closing, by the live process, the rendering process.

An aspect of the embodiments of this application further provides an avatar livestreaming apparatus, applied to a live application that includes a live process and a rendering process, where the avatar livestreaming apparatus includes:
  a sending module, configured to send, by the live process, a loading instruction of an avatar to the rendering process, so that the rendering process loads the avatar based on the loading instruction;
  a synchronization module, configured to: obtain face data of a user, and synchronize the face data to the rendering process, so that the rendering process renders the loaded avatar based on the face data; and
  a push module, configured to: obtain a rendering result by using a shared texture created by the rendering process, and push the rendering result as a video stream to a live server, where the rendering result is obtained after the rendering process renders the loaded avatar based on the face data.

This application further provides a computer device, where the computer device includes a memory, a processor, and a computer program stored in the memory and capable of running on the processor, and when executing the computer program, the processor implements steps of the foregoing method.

This application further provides a computer-readable storage medium that stores a computer program, where when the computer program is executed by a processor, steps of the foregoing method are implemented.

In the avatar livestreaming method provided in the embodiments of this application, after receiving the avatar adding instruction triggered by the user, the live process starts the rendering process; when receiving the ready message sent by the rendering process, the live process sends the loading instruction of the avatar to the rendering process, so that the rendering process loads the avatar based on the loading instruction; and in addition, the live process obtains the face data of the user in real time, and synchronizes the face data to the rendering process, so that the rendering process can render the loaded avatar based on the face data. After the rendering process completes the rendering operation, the live process obtains the rendering result by using the shared texture created by the rendering process, and pushes the rendering result as a video stream to the live server. In the avatar livestreaming method in this application, because the live process obtains the rendering result of the rendering process by using the shared texture, and the step of obtaining the rendering result by using the shared texture is performed in a GPU, no additional system overheads are generated for the CPU, so that a problem that page stalling occurs during avatar livestreaming can be avoided. This improves user experience.

DESCRIPTION OF EMBODIMENTS

Figure 1:
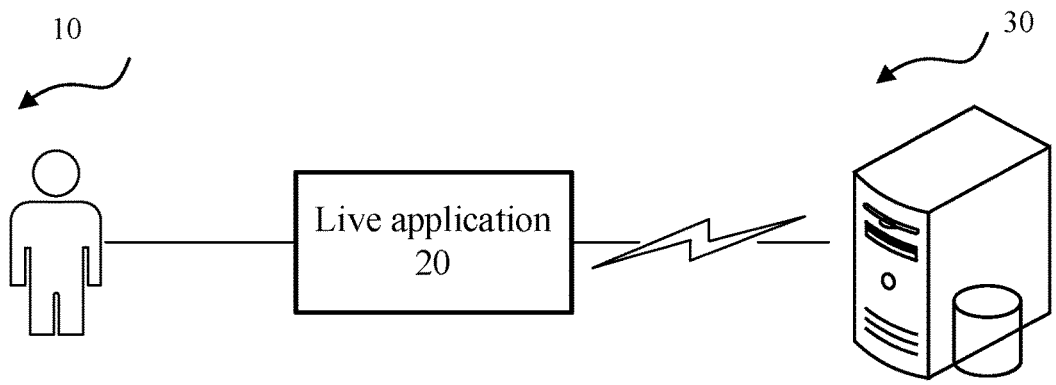
FIG. 1 is a schematic diagram of an environment of an avatar livestreaming method according to an embodiment of this application.

The following further describes advantages of this application with reference to the accompanying drawings and specific embodiments.

Example embodiments are described in detail herein, and examples of the example embodiments are presented in the accompanying drawings. When the following description relates to the accompanying drawings, unless otherwise specified, a same number in different accompanying drawings represents a same or similar element. Implementations described in the following example embodiments do not represent all implementations consistent with the present disclosure. On the contrary, they are only examples of apparatuses and methods that are described in the appended claims in detail and that are consistent with some aspects of the present disclosure.

The terms used in the present disclosure are merely used to describe specific embodiments, and are not intended to limit this disclosure. The terms "a", "said", and "the" of singular forms used in the present disclosure and the appended claims are also intended to include plural forms, unless otherwise specified in the context clearly. It should be further understood that the term "and/or" used in this specification indicates and includes any or all possible combinations of one or associated listed items.

It should be understood that, although terms "first", "second", "third", and the like may be used in the present disclosure to describe various information, the information is not limited by these terms. These terms are merely used to differentiate between information of the same type. For example, without departing from the scope of the present disclosure, "first information" may also be referred to as "second information", and similarly, "second information" may also be referred to as "first information". Depending on the context, for example, the word "if" used herein may be explained as "while", "when", or "in response to determining".

In the descriptions of this application, it should be understood that numerical symbols before steps do not indicate a sequence of performing the steps, but are only used to facilitate description of this application and differentiation of each step, and therefore cannot be construed as a limitation on this application.

Live software may be used to perform livestreaming by using an avatar. When the live software is used to perform livestreaming by using the avatar, to implement a complex physical effect and a complex particle effect at low costs, a game engine Unity is generally used to develop an avatar-related function in the live software. In a development process of the foregoing function, the inventor finds that Unity of a PC version can only run as an independent process, and cannot be embedded in a Win32 window as a sub-window. As a result, when the live software is used to perform livestreaming by using the avatar, the live software needs to first send the avatar to the Unity for rendering, and after completing rendering of the avatar in a video memory, Unity copies a rendering result from the video memory to a memory, so that the live software can obtain the rendering result from the memory, and transmit the rendering result to a live server, to implement livestreaming. However, in the foregoing process of copying the rendering result from the video memory to the memory, very large system overheads are required, and page stalling frequently occurs.

FIG. 1 is a schematic diagram of an application scenario according to an embodiment of this application. The application scenario includes a user 10, a live application 20, and a live server 30.

The user 10 is used to start the live application 20, and select an avatar in the live application 20 as an online streamer.

The live application 20 is used to perform video livestreaming by using the avatar selected by the user as the online streamer, and upload a video stream generated in video livestreaming to the live server 30.

The live server 30 is used to store the video stream uploaded by the live application 20, so that an audience terminal can obtain a live video stream from the live server 30, and decode and play the obtained live video stream. In this way, a live audience can view a live video.

The live application 20 is preferably an application that has a live function and that is installed on a desktop terminal such as a laptop computer or a desktop computer.

The live server 30 may be a separate server, a server cluster, a local server, or a cloud server. A specific type of the server may not be limited in this embodiment of this application.

Figure 2:
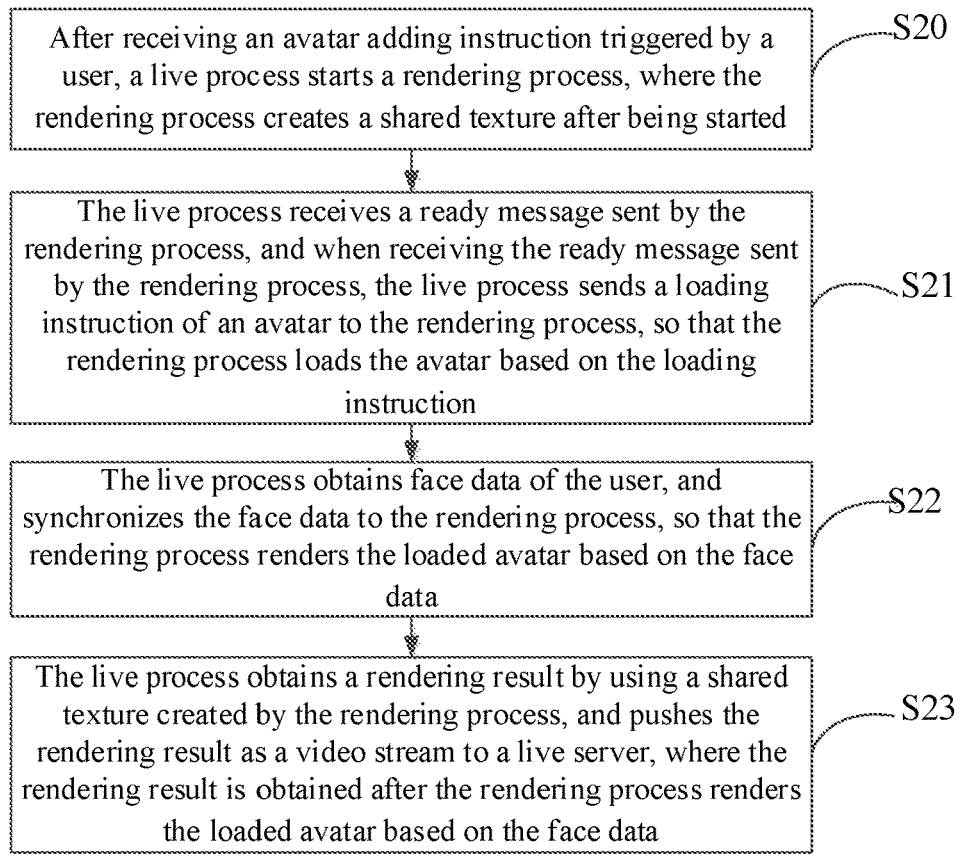
FIG. 2 is a flowchart of an embodiment of an avatar livestreaming method according to this application.

FIG. 2 is a schematic flowchart of an avatar livestreaming method according to an embodiment of this application. The avatar livestreaming method in this application is applied to a live application that includes a live process and a rendering process. The live application is an application (APP) having a live function. It may be understood that the flowchart in this method embodiment is not used to limit a sequence of performing steps. It may be learned from the figure that the avatar livestreaming method provided in this embodiment includes:

Step S20. After receiving an avatar adding instruction triggered by a user, the live process starts the rendering process.

Specifically, after the user starts the live application, the user may select, in the live application, an avatar as an online streamer for livestreaming. The avatar is a virtual intelligent image created by using a new technology such as VR, AR, optical motion tracking, and real-time motion synchronization, and usually has unique sound and a unique appearance.

The avatar adding instruction is used to add the avatar selected by the user as the online streamer.

The rendering process is a Win32 program developed based on an engine Unity. The engine Unity can be used to create, operate, and realize any real-time interactive 2D and 3D content, supports a platform including a mobile phone, a tablet computer, a PC, a game host, an augmented reality device, and a virtual reality device.

In an example, when the user expects to use the avatar as the online streamer for livestreaming, the user may select, in the live application, an avatar that the user expects to use. For example, an avatar A, an avatar B, and an avatar C exist in the live application for the user to select. In this case, when the user selects the avatar A as the online streamer for livestreaming, an avatar adding instruction is triggered. The live process may monitor, in real time or regularly, the avatar adding instruction triggered by the user, and after monitoring the avatar adding instruction, the live process may start the rendering process, so that the rendering process can perform a rendering operation on the avatar added by the user.

In an embodiment, the engine Unity may further render a real article in a rendering scenario. For example, after initializing the rendering scenario, the engine Unity may render an image that is of a water cup and that is collected by the user by using a camera of a computer device, to display the water cup in the rendering scenario.

In an example implementation, after the live process receives the avatar instruction triggered by the user, to subsequently communicate with the rendering process, the live process may create a shared memory, so that the live process and the rendering process can exchange data by using a shared memory communication technology.

In this embodiment, the live process and the rendering process may transmit, by using the shared memory, all data except data of a rendering result in avatar livestreaming, for example, transmit loading or unloading of avatar data, play motion data, face data, virtual co-hosting and virtual PK data, gift drop data, notification data in which the rendering process notifies the live process that the rendering result is updated.

As the name indicates, the shared memory means allowing two unrelated processes to access a same logical memory. The shared memory is a very effective manner of sharing and transmitting data between two running processes. A memory shared between different processes is usually a same segment of physical memory. Processes may connect the same segment of physical memory to address space of the processes, and all processes may access addresses in the shared memory. If a process writes data into the shared memory, a change made by the process immediately affects any other process that can access the same segment of shared memory.

In an implementation, after the live process creates the shared memory, to enable the rendering process to know the address of the created shared memory, when the live process starts the rendering process, the live process may notify the rendering process of a shared memory name of the shared memory in a form of a start parameter. In this way, after the rendering process is started, the rendering process may find a location of the shared memory based on the shared memory name, and access the shared memory. In an implementation, the start parameter may further include user ID information.

In this embodiment, after being started, the rendering process creates a shared texture, so that the rendering process can subsequently synchronize the rendering result to the live process by using the created shared texture.

In an example implementation, after being started, the rendering process further writes a handle of a shared texture and a ready message into the shared memory.

The ready message is used to indicate that the rendering process is in a ready state and may perform a rendering operation on the avatar.

In this embodiment, the handle of the shared texture is written into the shared memory, so that the live process can obtain the handle of the shared texture from the memory, and open the shared texture by using the handle of the shared texture. In addition, in this embodiment of this application, the ready message is written into the shared memory, so that the live process can obtain the ready message from the shared memory.

In an example implementation, after creating the shared texture, the rendering process may initialize the rendering scenario in the shared texture, so that the rendering process can subsequently perform a rendering operation on a to-be-rendered object in the rendering scenario.

It may be understood that, after the rendering process initializes the rendering scenario in the shared texture, to enable the live process to synchronize rendering data in the rendering process in a timely manner, after the live process obtains the ready message, the live process may open the shared texture by using the handle of the shared texture, and copy the data from the shared texture.

In an example implementation, to enable the live process or the rendering process to read data from the shared memory in a timely manner, the live process and the rendering process may agree in advance about a shared event, used to notify in a timely manner that content stored in the shared memory is updated.

Step S21. The live process receives the ready message sent by the rendering process, and when receiving the ready message sent by the rendering process, the live process sends a loading instruction of the avatar to the rendering process, so that the rendering process loads the avatar based on the loading instruction.

Specifically, after the rendering process is ready, the rendering process may send the ready message to the live process by using the shared memory. In this way, when receiving the ready message, the live process may send the loading instruction of the avatar to the rendering process, so that the rendering process can load the avatar based on the loading instruction.

Figure 3:
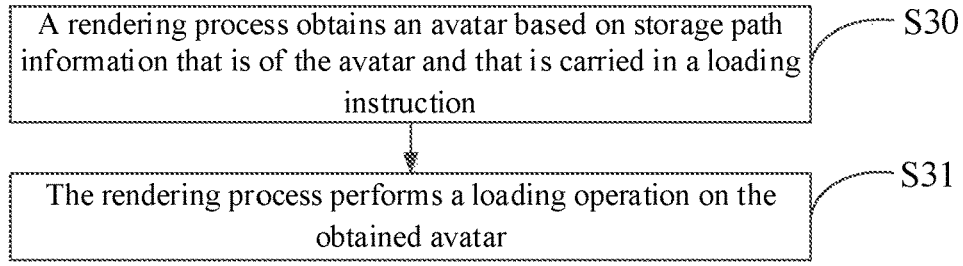
FIG. 3 is a detailed schematic flowchart of a step of loading, by a rendering process, an avatar based on a loading instruction according to an implementation of this application.

In an example implementation, referring to FIG. 3, that the rendering process loads the avatar based on the loading instruction includes: Step S30. The rendering process obtains the avatar based on storage path information that is of the avatar and that is carried in the loading instruction. Step S31. The rendering process performs a loading operation on the obtained avatar.

Specifically, the storage path information is a storage location of a storage file corresponding to the avatar, and the storage location is a local storage location on the computer device. In this embodiment, when loading the avatar, the rendering process first obtains the avatar based on the storage path information, reads the obtained avatar into a video memory, and then performs a loading operation on the avatar in the video memory. The loading operation means performing texture rendering on the avatar in the video memory.

In an implementation, after the rendering process obtains the avatar, to avoid a case in which the avatar may be tampered with in a process of obtaining the avatar, in this embodiment, the rendering process may perform a file verification operation on the avatar, to determine whether the currently obtained avatar is the avatar added by the user.

It may be understood that, before loading the avatar, the rendering process needs to first perform initialization processing on the avatar.

In an example implementation, after the rendering process performs a loading operation on the obtained avatar, the method further includes: The rendering process writes a loading result into the shared memory, so that the live process displays the loading result in a live interface.

Specifically, the loading result is used to feed back whether the user successfully adds the avatar in the live application.

In this embodiment, after the rendering process completes the loading operation on the avatar, to enable the user to learn whether the user successfully adds the avatar, the rendering process writes the loading result into the shared memory. In this way, the live process may obtain the loading result from the shared memory, and then display the obtained loading result in the current live interface. In this way, the user can intuitively view, in the live interface, whether the user successfully adds the avatar.

In an example, when the user successfully adds the avatar, the loading result may be "adding succeeds". When the user fails to add the avatar, the loading result may be "adding fails".

Step S22. The live process obtains face data of the user, and synchronizes the face data to the rendering process, so that the rendering process renders the loaded avatar based on the face data.

Specifically, the live process may collect the face data of the user in real time by using a built-in photographing apparatus or an external photographing apparatus of a terminal device on which the live application is installed, and synchronize the collected face data to the rendering process, so that the rendering process can render the avatar based on the face data.

Figure 4:
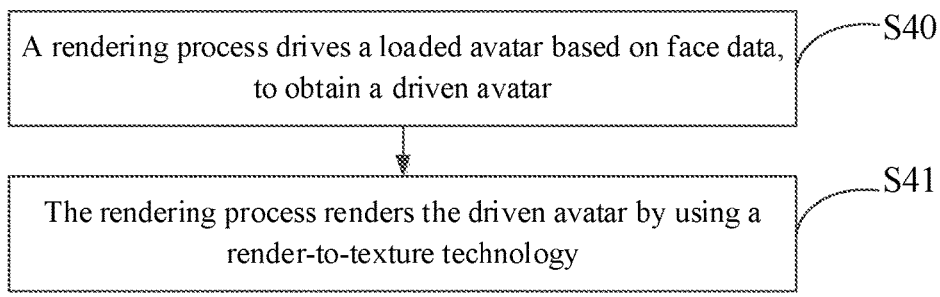
FIG. 4 is a detailed schematic flowchart of a step of rendering, by a rendering process, a loaded avatar based on face data according to an implementation of this application.

In an example implementation, referring to FIG. 4, that the rendering process renders the loaded avatar based on the face data includes:

Step S40. The rendering process drives the loaded avatar based on the face data, to obtain a driven avatar.

Specifically, that the rendering process drives the loaded avatar based on the face data means that the rendering process performs a rendering operation such as a blink operation, a mouth opening operation, and a head shaking operation on the avatar based on the face data.

Step S41. The rendering process renders the driven avatar by using a render-to-texture technology.

Specifically, the render-to-texture (RTT) technology is a technology that draws the rendering result to texture mapping instead of a screen (window).

In this embodiment, the rendering process renders the driven avatar by using the render-to-texture technology, so that the obtained rendering result can be conveniently synchronized to the live process.

Step S23. The live process obtains the rendering result by using the shared texture created by the rendering process, and pushes the rendering result as a video stream to a live server, where the rendering result is obtained after the rendering process renders the loaded avatar based on the face data.

Specifically, after rendering the loaded avatar based on the facial data to obtain the rendering result, the rendering process stores the rendering result into the shared texture, so that the live process can obtain the rendering result from the rendering process, and after obtaining the rendering result, push the rendering result as a video stream to the live server, to implement video livestreaming. In this embodiment, after the rendering process completes the rendering operation, to enable the live process to obtain the rendering result in a timely manner by using the shared texture, the rendering process writes a rendering success message into the shared memory, so that the live process can obtain the rendering result in a timely manner from the shared texture based on the message in the shared memory.

Figure 5:
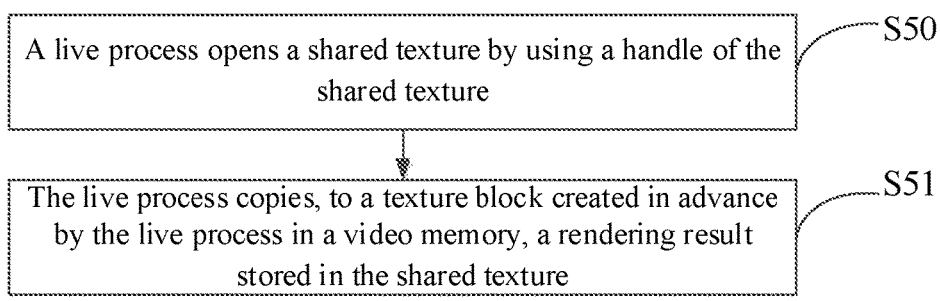
FIG. 5 is a detailed schematic flowchart of a step of obtaining, by a live process, a rendering result by using a shared texture created by a rendering process according to an implementation of this application.

In an example implementation, referring to FIG. 5, that the live process obtains the rendering result by using the shared texture created by the rendering process includes: Step S50. The live process opens the shared texture by using the handle of the shared texture. Step S51. The live process copies, to a texture block created in advance by the live process in the video memory, the rendering result stored in the shared texture.

Specifically, before obtaining the rendering result, the live process creates the texture block in advance in the video memory, so that the rendering result obtained after the rendering process renders the loaded avatar based on the face data can be subsequently stored by using the texture block.

In this embodiment, when obtaining the rendering result, the live process first opens, by using the handle of the shared texture, the shared texture created in advance by the rendering process. Then, the live process may use a GPU to copy, to the texture block created in advance by the live process, the rendering result stored in the shared texture, to synchronously obtain the rendering result.

It should be noted that, when the video stream is pushed to the live server, the video stream is generally pushed frame-by-frame. Therefore, in this embodiment, to continuously obtain the video stream that is pushed to the live server, step S22 and S23 need to be cyclically performed until the user deletes the avatar, that is, until the user ends performing livestreaming by using the avatar as the online streamer.

In the avatar livestreaming method provided in this embodiment of this application, after receiving the avatar adding instruction triggered by the user, the live process starts the rendering process; when receiving the ready message sent by the rendering process, the live process sends the loading instruction of the avatar to the rendering process, so that the rendering process loads the avatar based on the loading instruction; and in addition, the live process obtains the face data of the user in real time, and synchronizes the face data to the rendering process, so that the rendering process can render the loaded avatar based on the face data.

After the rendering process completes the rendering operation, the live process obtains the rendering result by using the shared texture created by the rendering process, and pushes the rendering result as a video stream to the live server. In the avatar livestreaming method in this application, because the live process obtains the rendering result of the rendering process by using the shared texture, and the step of obtaining the rendering result by using the shared texture is performed in a GPU, no additional system overheads are generated for the CPU, so that a problem that page stalling occurs during avatar livestreaming can be avoided. This improves user experience.

In an example implementation, the method further includes:

When receiving an avatar delete instruction triggered by the user, the live process closes the rendering process.

Specifically, when the user expects to end performing livestreaming by using the avatar as the online streamer, the user may trigger the avatar delete instruction. The live process may monitor the avatar delete instruction in real time. When monitoring the avatar delete instruction, the live process may close the rendering process, to reduce system overheads.

For ease of understanding of this application, the following describes an implementation procedure of this application in detail by using a specific embodiment.

Figure 6:
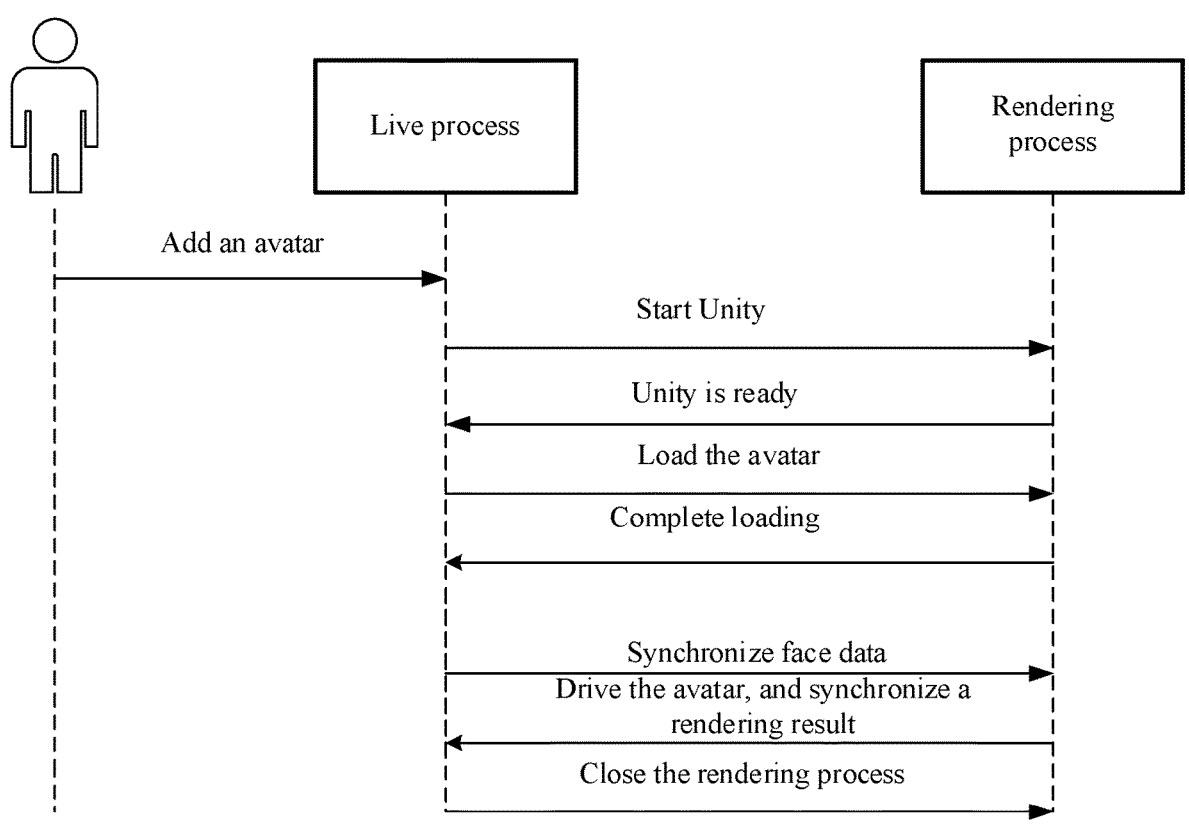
FIG. 6 is a time sequence diagram of an avatar livestreaming method according to an implementation of this application.

Referring to FIG. 6, after a live application is started, a user first adds, in the live application, an avatar as an online streamer for livestreaming. After adding the avatar, the user triggers an avatar adding instruction. A live process in the live application may monitor the avatar adding instruction in real time or regularly, and after receiving the avatar adding instruction, the live process starts Unity as a rendering process in the live application. After being started, the rendering process performs a serialized initialization operation, and after completing the initialization operation, sends a Unity ready message to the live process. After receiving the message, the live process sends a loading instruction of the avatar to the rendering process. The rendering process loads the avatar based on the loading instruction, and after completing loading, sends a loading complete message to the live process. After receiving the message, the live process synchronizes obtained face data to the rendering process frame-by-frame. After obtaining the face data, the rendering process drives the avatar by using the face data, and synchronizes a rendering result to the live process. When the live process receives an avatar delete instruction triggered by the user, the live process sends a rendering process close message to the rendering process, so that the rendering process can close the rendering process based on the message.

Figure 7:
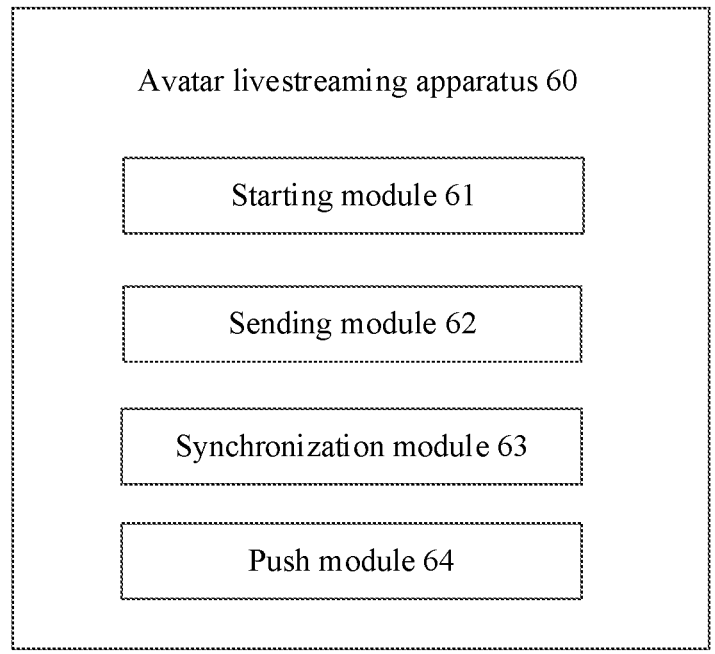
FIG. 7 is a program module diagram of an embodiment of an avatar livestreaming apparatus according to this application.

FIG. 7 is a program module diagram of an embodiment of an avatar livestreaming apparatus 60 according to this application. The avatar livestreaming apparatus 60 may be applied to a live application that includes a live process and a rendering process.

In this embodiment, the avatar livestreaming apparatus 60 includes a series of computer program instructions stored in a memory. When the computer program instructions are executed by a processor, an avatar livestreaming function in the embodiments of this application may be implemented. In some embodiments, based on a specific operation implemented by each part of the computer program instructions, the avatar livestreaming apparatus 60 may be divided into one or more modules, and may be specifically divided into the following modules:

a starting module 61, configured to: after receiving an avatar adding instruction triggered by a user, start, by the live process, the rendering process;

a sending module 62, configured to: when receiving a ready message sent by the rendering process, send, by the live process, a loading instruction of an avatar to the rendering process, so that the rendering process loads the avatar based on the loading instruction;

a synchronization module 63, configured to: obtain, by the live process, face data of a user, and synchronize the face data to the rendering process, so that the rendering process renders the loaded avatar based on the face data; and a push module 64, configured to: obtain, by the live process, a rendering result by using a shared texture created by the rendering process, and push the rendering result as a video stream to a live server, where the rendering result is obtained after the rendering process renders the loaded avatar based on the face data.

In an example implementation, the live process and the rendering process implement inter-process data exchange by using a shared memory.

In an example implementation, after being started, the rendering process further writes a handle of the shared texture and a ready message to the shared memory.

In an example implementation, that the rendering process loads the avatar based on the loading instruction includes: The rendering process obtains the avatar based on storage path information that is of the avatar and that is carried in the loading instruction; and the rendering process performs a loading operation on the obtained avatar.

In an example implementation, after the rendering process performs a loading operation on the obtained avatar, the following is further included: The rendering process writes a loading result into the shared memory, so that the live process displays the loading result in a live interface.

In an example implementation, that the live process obtains a rendering result by using a shared texture created by the rendering process includes: The live process opens the shared texture by using a handle of the shared texture; and the live process copies, to a texture block created in advance by the live process in a video memory, the rendering result stored in the shared texture.

In an example implementation, that the rendering process renders the loaded avatar based on the face data includes: The rendering process renders the loaded avatar based on the face data, to obtain a driven avatar; and the rendering process renders the driven avatar by using a render-to-texture technology.

In an example implementation, when receiving an avatar delete instruction triggered by the user, the live process closes the rendering process.

In the avatar livestreaming method provided in this embodiment of this application, after receiving the avatar adding instruction triggered by the user, the live process starts the rendering process; when receiving the ready message sent by the rendering process, the live process sends the loading instruction of the avatar to the rendering process, so that the rendering process loads the avatar based on the loading instruction; and in addition, the live process obtains the face data of the user in real time, and synchronizes the face data to the rendering process, so that the rendering process can render the loaded avatar based on the face data. After the rendering process completes the rendering operation, the live process obtains the rendering result by using the shared texture created by the rendering process, and pushes the rendering result as a video stream to the live server. In the avatar livestreaming method in this application, because the live process obtains the rendering result of the rendering process by using the shared texture, and the step of obtaining the rendering result by using the shared texture is performed in a GPU, no additional system overheads are generated for the CPU, so that a problem that page stalling occurs during avatar livestreaming can be avoided. This improves user experience.

Figure 8:
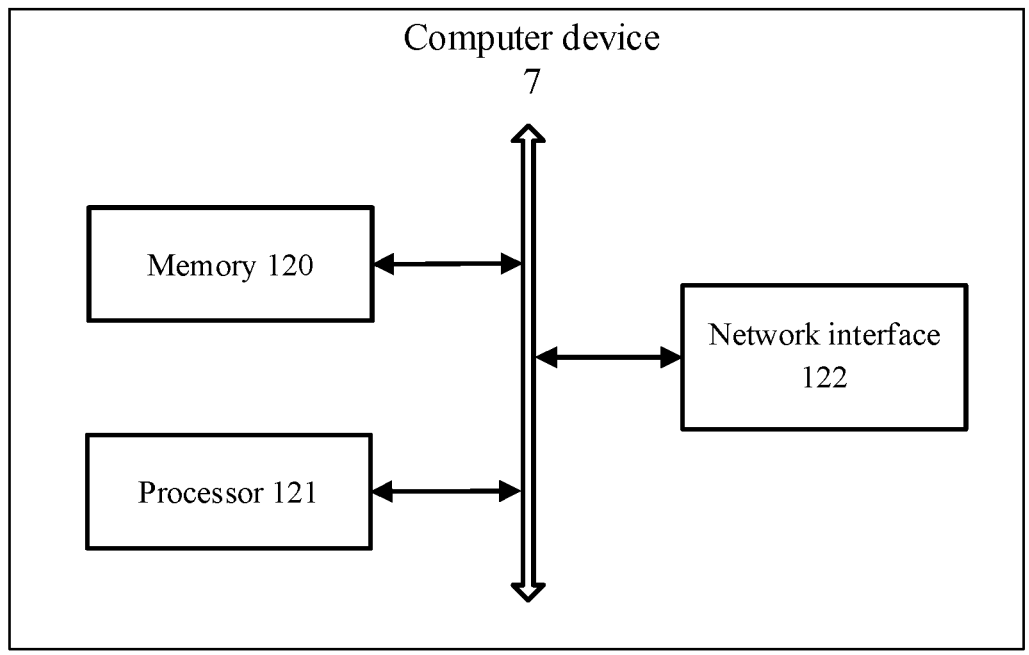
FIG. 8 is a schematic diagram of a hardware structure of a computer device that performs an avatar livestreaming method according to an embodiment of this application.

FIG. 8 is a schematic diagram of a hardware architecture of a computer device 7 suitable for implementing an avatar livestreaming method according to an embodiment of this application. In this embodiment, the computer device 7 is a device that can automatically calculate a value and/or process information based on an instruction that is set or stored in advance. For example, the computer device 7 may be a tablet computer, a notebook computer, a desktop computer, a rack server, a blade server, a tower server, or a cabinet server (including an independent server, or a server cluster including servers). As shown in FIG. 8, the computer device 7 at least includes but is not limited to a memory 120, a processor 121, and a network interface 122 that can be communicatively connected to each other by using a system bus.

The memory 120 includes at least one type of computer-readable storage medium. The readable storage medium may be volatile or non-volatile. Specifically, the readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 120 may be an internal storage module of the computer device 7, for example, a hard disk or a memory of the computer device 7. In some other embodiments, the memory 120 may be an external storage device of the computer device 7, for example, a removable hard disk, a smart media card (SMC), a secure digital (SD) card, or a flash card that is disposed on the computer device 7. Certainly, the memory 120 may include both an internal storage module of the computer device 7 and an external storage device of the computer device 7. In this embodiment, the memory 120 is generally configured to store an operating system and various application software that are installed on the computer device 7, for example, program code of the avatar livestreaming method. In addition, the memory 120 may be further configured to temporarily store various types of data that has been output or is to be output.

The processor 121 may be a central processing unit (CPU), a controller, a microcontroller, a microprocessor, or another avatar livestreaming chip in some embodiments. The processor 121 is generally configured to control an overall operation of the computer device 7, for example, perform control and processing related to data exchange or communication performed by the computer device 7. In this embodiment, the processor 121 is configured to run program code stored in the memory 120 or process data.

The network interface 122 may include a wireless network interface or a wired network interface, and the network interface 122 is generally configured to establish a communication link between the computer device 7 and another computer device. For example, the network interface 122 is configured to: connect the computer device 7 to an external terminal by using a network, and establish a data transmission channel, a communication link, and the like between the computer device 7 and the external terminal. The network may be a wireless or wired network such as an intranet, the Internet, a global system for mobile communications (GSM), a wideband code division multiple access (WCDMA), a 4G network, a 5G network, Bluetooth, or Wi-Fi.

It should be noted that FIG. 8 shows only a computer device with the components 120 to 122. However, it should be understood that implementation of all the shown components is not required, and more or fewer components may be alternatively implemented.

In this embodiment, the avatar livestreaming method stored in the memory 120 may be further divided into one or more program modules to be executed by one or more processors (the processor 121 in this embodiment), so as to complete this application.

An embodiment of this application provides a computer-readable storage medium. The computer-readable storage medium stores a computer program. When the computer program is executed by a processor, steps of the avatar livestreaming method in the embodiments are implemented.

In this embodiment, the computer-readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is generally configured to store an operating system and various application software that are installed on the computer device, for example, program code of the avatar livestreaming method in the embodiments. In addition, the computer-readable storage medium may be further configured to temporarily store various types of data that has been output or is to be output.

The apparatus embodiments described above are only examples, and units described as separate parts may or may not be physically separated, and parts displayed as units may or may not be physical units, that is, may be located in one place, or may be distributed on at least two network units. Some or all of the modules may be selected based on actual needs to achieve the objective of the solution of the embodiments of this application. Persons of ordinary skill in the art may understand and implement the embodiments without creative efforts.

Based on the foregoing descriptions of the implementations, persons of ordinary skill in the art may clearly understand that the implementations may be implemented by software in addition to a universal hardware platform, or certainly, may be implemented by hardware. Persons of ordinary skill in the art may understand that all or some of procedures for implementing the methods in the foregoing embodiments may be completed by a computer program instructing relevant hardware. The program may be stored in a computer-readable storage medium. When the program is executed, the procedures of the embodiments of the foregoing methods may be included. The storage medium may be a magnetic disk, an optical disc, a read-only memory (ROM), a random access memory (RAM), or the like.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method of implementing a live stream using an avatar, applied to a live application, wherein the method comprises:
    monitoring, by a live process of the live application, a selection of the avatar as an online streamer by a user;
    starting, by the live process, a rendering process in response to detecting the selection of the avatar;
    creating, by the rendering process, a shared texture configured to enable the live process to obtain a rendering result from the rendering process;
    creating, by the live process, a shared memory through which the live process and the rendering process exchange data except the rendering result;
    collecting in real time, by the live process, facial data indicating movements or expressions associated with a face or a head of the user and synchronizing the facial data to the rendering process;
    rendering, by the rendering process, the avatar in the shared texture based on the facial data;
    writing, by the rendering process, a handle of the shared texture and a ready message into the shared memory;
    receiving, by the live process, a ready message from the rendering process indicating that the rendering process is ready; and
    obtaining, by the live process, the rendering result in the shared texture, and pushing the rendering result as a video stream to a live server.

2. The method according to claim 1, wherein the live process and the rendering process implement inter-process data exchange using the shared memory.

3. The method according to claim 1, wherein the method further comprises: sending, by the live process, an instruction of loading the avatar to the rendering process in response to receiving the ready message from the rendering process; and loading, by the rendering process, the avatar based on the instruction.

4. The method according to claim 3, wherein the loading, by the rendering process, the avatar based on the instruction further comprises:
    obtaining, by the rendering process, the avatar based on storage path information carried in the instruction, wherein the storage path information indicates a storage location of the avatar; and
    performing, by the rendering process, a loading operation on the avatar.

5. The method according to claim 4, wherein after the performing, by the rendering process, a loading operation on the avatar, the method further comprises:
    writing, by the rendering process, a loading result into the shared memory, wherein the loading result indicates whether the avatar has been successfully added in the live application; and
    displaying, by the live process, the loading result in a live interface.

6. The method according to claim 1, wherein the obtaining, by the live process, the rendering result in the shared texture further comprises:
    opening, by the live process, the shared texture using a handle of the shared texture, wherein the handle of the shared texture was written into the shared memory by the rendering process; and
    copying, by the live process, the rendering result from the shared texture to a texture block created in advance by the live process in a video memory.

7. The method according to claim 1, wherein the rendering, by the rendering process, the avatar in the shared texture based on the facial data further comprises:
    driving, by the rendering process, the avatar based on the facial data to obtain a driven avatar; and
    rendering, by the rendering process, the driven avatar using a render-to-texture technology.

8. The method according to claim 1, wherein the method further comprises:
    closing, by the live process, the rendering process in response to receiving an instruction of deleting the avatar triggered by the user.

9. A computing device, wherein the computer device comprises a memory, a processor, and a computer program stored in the memory and executable by the processor, and when executing the computer program, the processor implements operations comprising:
    monitoring, by a live process of the live application, a selection of the avatar as an online streamer by a user;
    starting, by the live process, a rendering process in response to detecting the selection of the avatar;
    creating, by the rendering process, a shared texture configured to enable the live process to obtain a rendering result from the rendering process;
    creating, by the live process, a shared memory through which the live process and the rendering process exchange data except the rendering result;
    collecting in real time, by the live process, facial data indicating movements or expressions associated with a face or a head of the user and synchronizing the facial data to the rendering process;
    rendering, by the rendering process, the avatar in the shared texture based on the facial data;
    writing, by the rendering process, a handle of the shared texture and a ready message into the shared memory;
    receiving, by the live process, a ready message from the rendering process indicating that the rendering process is ready; and
    obtaining, by the live process, the rendering result in the shared texture, and pushing the rendering result as a video stream to a live server.

10. The computing device according to claim 9, wherein the operations further comprise: sending, by the live process, an instruction of loading the avatar to the rendering process in response to receiving the ready message from the rendering process; and loading, by the rendering process, the avatar based on the instruction, wherein the loading, by the rendering process, the avatar based on the instruction further comprises: obtaining, by the rendering process, the avatar based on storage path information carried in the instruction, wherein the storage path information indicates a storage location of the avatar, and performing, by the rendering process, a loading operation on the avatar.

11. The computing device according to claim 9, wherein the obtaining, by the live process, the rendering result in the shared texture further comprises:
   opening, by the live process, the shared texture using a handle of the shared texture, wherein the handle of the shared texture was written into the shared memory by the rendering process; and
   copying, by the live process, the rendering result from the shared texture to a texture block created in advance by the live process in a video memory.

12. The computing device according to claim 9, wherein the rendering, by the rendering process, the avatar in the shared texture based on the facial data further comprises:
   driving, by the rendering process, the avatar based on the facial data to obtain a driven avatar; and
   rendering, by the rendering process, the driven avatar using a render-to-texture technology.

13. The computing device according to claim 9, wherein the operations further comprise:
   closing, by the live process, the rendering process in response to receiving an instruction of deleting the avatar triggered by the user.

14. A non-transitory computer-readable storage medium, storing a computer program, wherein when the computer program is executed by a processor, the processer implements operations comprising:
   monitoring, by a live process of the live application, a selection of the avatar as an online streamer by a user;
   starting, by the live process, a rendering process in response to detecting the selection of the avatar;
   creating, by the rendering process, a shared texture configured to enable the live process to obtain a rendering result from the rendering process;
   creating, by the live process, a shared memory through which the live process and the rendering process exchange data except the rendering result;
   collecting in real time, by the live process, facial data indicating movements or expressions associated with a face or a head of the user and synchronizing the facial data to the rendering process;
   rendering, by the rendering process, the avatar in the shared texture based on the facial data;
   writing, by the rendering process, a handle of the shared texture and a ready message into the shared memory;
   receiving, by the live process, a ready message from the rendering process indicating that the rendering process is ready; and
   obtaining, by the live process, the rendering result in the shared texture, and pushing the rendering result as a video stream to a live server.

15. The non-transitory computer-readable storage medium of claim 14, wherein the rendering, by the rendering process, the avatar in the shared texture based on the facial data further comprises:
   driving, by the rendering process, the avatar based on the facial data to obtain a driven avatar; and
   rendering, by the rendering process, the driven avatar using a render-to-texture technology.

16. The non-transitory computer-readable storage medium of claim 14, wherein the obtaining, by the live process, the rendering result in the shared texture further comprises:
   opening, by the live process, the shared texture using a handle of the shared texture, wherein the handle of the shared texture was written into the shared memory by the rendering process; and
   copying, by the live process, the rendering result from the shared texture to a texture block created in advance by the live process in a video memory.

* * * * *